United States Patent

Baker

[15] 3,691,924
[45] Sept. 19, 1972

[54] EXPANSIBLE DRIVE RIVET

[72] Inventor: William H. Baker, 403 Loudonville Road, Albany, N.Y. 12211

[22] Filed: May 18, 1970

[21] Appl. No.: 38,371

[52] U.S. Cl. ............................................85/68, 85/82
[51] Int. Cl. ..............................................F16b 15/04
[58] Field of Search .................................85/68, 82

[56] References Cited

UNITED STATES PATENTS

| | | | |
|---|---|---|---|
| 3,487,745 | 1/1970 | Brunelle | 85/82 |
| 3,130,629 | 4/1964 | Church | 85/82 |
| 2,264,747 | 12/1941 | Fether | 85/82 |

FOREIGN PATENTS OR APPLICATIONS

| | | | |
|---|---|---|---|
| 1,552,550 | 11/1968 | France | 85/68 |
| 73,272 | 9/1916 | Switzerland | 85/68 |

Primary Examiner—Edward C. Allen
Attorney—Janes & Chapman

[57] ABSTRACT

An expansible drive rivet is provided for blind riveting of at least two work pieces without the necessity of preforming rivet holes in the work. The rivet shank has a driving head at one end and a pointed tip at the other end adapted to penetrate the work when a driving force is applied thereto, and a blind central bore extending axially therein which is open at the head end and has a constricted portion of reduced diameter near its closed end. An expander pin engages the central bore and expands the shank to form a locking head on the inner side of the work when forced into the constricted portion.

9 Claims, 3 Drawing Figures

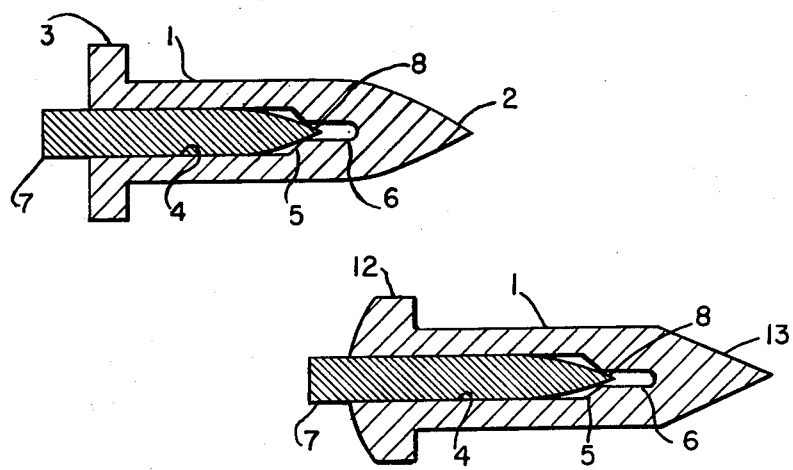
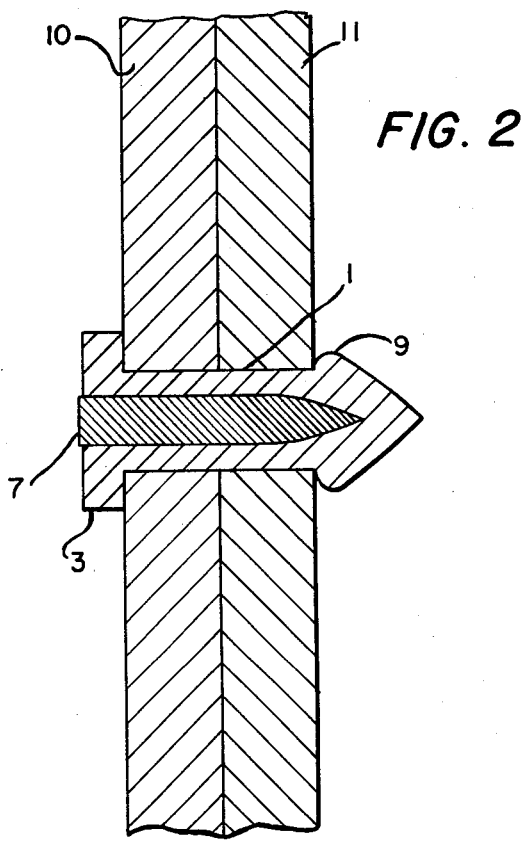

EXPANSIBLE DRIVE RIVET

In fastening two or more work pieces together where access to one side of the work is limited, it has been conventional to employ rivets in which the inner end of the rivet shank is expanded from the accessible side of the work to form a blind locking head. Blind rivets usually comprise a blunt nosed shank having a central bore extending therethrough, in which the bore has a constricted portion of reduced diameter at the inner end of the shank. After the rivet is inserted into a preformed hole in the work, the inner end of the shank is expanded to form the blind head and lock it in position by means of a pin which is driven under force into or through the constricted portion of the central bore. An expansible blind rivet of this type is shown in U.S. Pat. No. 3,130,629 to Church, patented Apr. 28, 1964.

However, blind rivets require preformed rivet holes in the work. This means either expensive jigs to locate the rivet holes in the proper place before assembly, or on-sight drilling of the holes after the work has been placed and temporarily secured in its proper assembled position, is necessary.

In accordance with the present invention, an expansible rivet is provided to fasten together at least two work pieces without the necessity pre-forming rivet holes in the work. The expansible rivet disclosed herein is adapted to penetrate the work when a driving force is applied thereto, and thereafter be expanded to secure it in place from the entrance side of the work.

The expansible drive rivet of the present invention comprises a shank having a driving head at one end, a pointed tip at the other end adapted to penetrate the work when a driving force is applied to the head, and a blind central bore extending axially therein, open at the head end and having a constricted portion of reduced diameter near the closed end. An expander pin is adapted to engage the central bore and expand the shank, to form a locking head on the inner side of the work, when forced into the constricted portion of the bore.

The expansible drive rivet of the invention is illustrated further in the drawings, in which:

FIG. 1 shows a cross-sectional view of a preferred embodiment of the drive rivet with the expander pin inserted in place.

FIG. 2 shows the drive rivet installed within the work to be secured.

FIG. 3 shows another embodiment of drive rivet in accordance with the invention.

The shank of the rivet is adapted to penetrate the work by application of force thereto. Therefore, the contour of the pointed tip and the geometric shape of the shank are quite important. The tip can be conically, parabolically, or pyramidally tapered, and must have a sharp point. If a pyramidally tapered point is employed, the corners of the facets should also be sharp, to further assist in penetrating the work. The included angle of the apex of the point should be sufficiently small to ensure penetration of the work with a minimum of resistance, and yet sufficiently large to prevent its fracture. In most cases, an included angle of from 20° to 45° is satisfactory.

The shank can have any uniform geometric cross-sectional shape, such as circular, triangular, square, or polygonal. Nonuniform shapes, such as rectangular, can also be used, but are not preferred, since they are less efficient for penetration. If the shank is multisided, sharp corners between the sides are desirable, to aid in penetration of the work. Similarly, where the shank cross-section is multisided, a pyramidally tapered point having the same number of sides as the shank is desirable. In addition, the transition zone between the tapered tip and the sides of the shank should be smoothly contoured, to guide the rivet into the work.

In the preferred embodiment of the invention, the shank of the rivet is cylindrical, and has a conically or parabolically tapered point, since this is the most efficient shaped for penetration.

The driving head on the shank is an outwardly extending flange, which provides a flat or rounded surface to which the driving force can be applied by a hammer or mallet, and prevents the rivet from passing entirely through the outer surface of the work, when the rivet is installed. It also provides the locking outer portion cooperating with the expanded blind locking head, to hold the work pieces together. The head can have any desired cross-sectional shape, such as circular or square, and the driving surface can have any contour, but a flat surface is preferred. A round surface may be flattened, and expand the locking surface against the outer surface of the work.

In order to properly penetrate the work, the rivet shank must have sufficient strength to withstand the necessary driving force without buckling. The factors that must be considered in this regard are the relative tensile strength and hardness of the rivet and the material to be penetrated, the thickness of the work to be riveted, and the ratio of the outside dimensions of the rivet with respect to the diameter of the central bore. The application of well-known strength-of-material equations will enable those skilled in the art to properly select a suitable material and determine dimensional limits for the rivet shank. Materials that can be used include metals such as steel, iron, aluminum, titanium alloys, nickel alloys, chromium alloys, and lead. Plastic materials can also be used, to secure plastic and softer work pieces together. A thermosetting material can be cured after expansion to set the blind head against dimensional changes.

The central bore in the shank is open at the head end, and extends within the rivet, preferably axially, up to the approximate location of the portion to be expanded to form the blind head. This is referred to herein as the transition zone between the outside wall and the tapered tip. The bore should not extend substantially into the tapered tip since it will weaken it. However, penetration of a reduced diameter portion of the bore into the tapered tip that is not detrimental can be tolerated. The bore has a substantially uniform diameter over most of its length, and in the portion to be expanded to form the blind head has a reduced diameter, and a tapered shoulder leading into the reduced diameter portion, near its closed end.

Although it is preferred that the bore have a circular cross-section in the interest of cost and performance, elliptical or polygonal shapes such as triangular and square are also satisfactory.

Important considerations in the strength of the rivet are the diameter of the bore, and the difference between the reduced diameter portion and the major diameter, and these also determine the amount of expansion that occurs when the expander pin is forced therein. Similarly, the location of the reduced diameter portion of the bore determines at what point on the outside of the shank expansion will take place, and thus is selected to accommodate the combined thicknesses of the work parts to be riveted together. These dimensions are determined readily, as known to those skilled in the art.

The expander pin is shaped in cross-section to fit within the normal diameter portion of the bore and is sufficiently larger than the narrowed portion to expand it to form the blind head. For this purpose, it may have uniform diameter over approximately 65 to 90 percent of its length. One end terminated in a pointed nose section, which is adapted to guide the pin into the reduced diameter portion of the bore. The diameter of the pin may be approximately equal to the normal diameter portion of the bore, but is preferably slightly smaller than the bore diameter, so that the pin slips easily thereinto. However, it can also be larger than the normal diameter portion, and is then press-fitted, and expands the rivet over its entire length, to aid in securing it in place. Since the forced penetration of the rivet in the work results in an extremely tight fit, little is gained, however, by the radial expansion of the entire shank.

The pin is long enough to expand the blind head. Preferably, the pin is slightly longer than the central bore, so that it may be forced into the full length of the bore from the outside. However, a shorter pin may also be employed where a tool capable of engaging the bore and applying the required expansion force to the pin is available. The pin should be formed from a material having a tensile strength equal to or greater than the rivet shank, to avoid deformation during insertion.

Since the central bore of the rivet is closed at one end, and does not provide a through flow path, the drive rivet of this invention may be employed to secure work pieces in a leak-tight fit. This is particularly advantageous in the case of a riveted sheet metal tank or bulkhead, where access to the interior of the tank is limited. In such an instance, the use of the expansible rivets of the prior art is precluded, since the central bore in those rivets is open at both ends, and thus provides a leakage path.

In use, the rivet of the invention is driven into or through the work to be riveted by applying the required force to the head, either manually, by a hammer or mallet, or by some mechanical means, such as a power charge gun, or a pneumatic or hydraulic press.

Preferably the expander pin is inserted into the central bore prior to driving the rivet into the work to provide additional support against buckling. But in some instances particularly where the work is relatively soft or thin, the pin need not be inserted until the rivet is driven into place. After the rivet has penetrated the work, and the driving head has been driven smartly against the outside surface through which the rivet has been driven in, the expander pin is forced into the reduced diameter constriction by either manual or mechanical force. When the pin enters the reduced diameter portion of the bore, that portion is enlarged. Since the material of the rivet is not compressible, the enlargement of the constricted bore to accommodate the expander pin results in the corresponding expansion of the outside of the shank, thus forming a blind locking head on the inner side of the work, securing the rivet in place, and the work pieces together.

The drive rivet shown in FIG. 1 is made of hard steel, and comprises a cylindrical shank 1 having a driving head 3 at one end, and a parabolically tapered pointed tip 2 at the other end, adapted to penetrate the work to be riveted when a driving force such as a hammer is applied to the head 3. A blind central bore 4 open at the driving head end and having a constricted portion of reduced diameter 6 at its closed end is formed within the shank 1. A tapered shoulder 5 provides a lead-in from the bore 4 to the reduced diameter portion 6. An expander pin 7 fits within the central bore 4 of the shank 1, and has a tapered nose 8 which engages the reduced diameter portion 6 of the bore.

In use, the rivet is driven by a power charge gun or other suitable means into and through a material to be fastened (such as sheet metal layers 10 and 11 shown in FIG. 2) by applying the required force to the head 3. The point 2 pierces the work, and thereby provides a path for full penetration thereof by the shank 1.

After the rivet has penetrated the sheets 10 and 11, another driving force is applied to the pin 7, which is thereby forced into the constricted portion 6 of the bore, to expand the shank of the rivet, and thus form a locking head 9 on the inner side of the sheets 10 and 11, to secure the rivet in place and the sheets together.

The drive rivet shown in FIG. 3 is made of hard steel, and comprises (as in the rivet of FIG. 1) a cylindrical shank 1 having a rounded driving head 12 at one end and a conically tapered pointed tip 13 at the other end, adapted to penetrate the work to be riveted when a driving force such as a hammer is applied to the rounded head 12. A blind central bore 4, open at the driving head end and having a constricted portion of reduced diameter 6 at its closed end, is formed within the shank 1. A tapered shoulder 5 provides a lead end from the bore 4 to the reduced diameter portion 6. An expanded pin 7 fits within the central bore 4 of the shank 1, and has a tapered nose which engages the reduced diameter portion 6 of the bore.

In use, the rivet is driven by a power charge gun or other suitable means into and through a material to be fastened, such as sheet metal layers 10 and 11 shown in FIG. 2, by applying the required force to the head 13. The point 2 pierces the work and thereby provides a path for full penetration thereof by the shank 1. After the rivet has penetrated the sheets 10 nd 11, another driving force is applied to the pin 7, which is thereby forced into the constricted portion 6 of the bore, to expand the shank of the rivet and thus form a locking head 9 on the inner side of the sheets 10 and 11, to secure the rivet in place, and the sheets together.

Having regard to the foregoing disclosure, the following is claimed as the inventive and patentable embodiments thereof.

1. An expansible rivet for riveting at least two work pieces together without the necessity of pre-forming rivet holes in the work, comprising a shank member having a driving head at one end and a pointed tip at the other end, to penetrate the work when a driving force is applied to the head; a central bore extending longitudinally thereof, open at the head end and closed at the other end, and having a relatively wide bore portion, a shoulder, and a constricted portion of reduced diameter near its closed end, and a shank portion which extends from the tip to a location beyond the shoulder towards the driving head and which has a substantially straight uninterrupted external surface, the shank portion being expandible at the constricted bore portion without rupture thereof to form a locking head on the inner side of the work, and an expander pin member having a leading end which engages the shoulder of the bore and expands the shank there to form a locking head on the inner side of the work before moving into the constricted portion of the bore, so as to expand the shank without opening the closed end of the bore.

2. An expansible rivet in accordance with claim 1, in which the pointed tip has an included angle within the range from 20° to 45°.

3. An expansible rivet in accordance with claim 1, in which the pointed tip is parabolically tapered.

4. An expansible rivet in accordance with claim 1, in which the pointed tip is conically tapered.

5. An expansible rivet in accordance with claim 1, in which the shank is cylindrical.

6. An expansible rivet in accordance with claim 1, in which the driving head has a flat surface.

7. An expansible rivet in accordance with claim 1, in which the driving head has a rounded surface.

8. An expansible rivet in accordance with claim 1, in which the expander pin has a larger cross-section than the central bore and thereby expands the entire shank of the rivet.

9. An expansible rivet in accordance with claim 1, in which the expander pin is adapted to remain within the central bore after the formation of the locking head.

* * * * *